(12) United States Patent
Liu et al.

(10) Patent No.: US 8,220,712 B2
(45) Date of Patent: Jul. 17, 2012

(54) MICRO SCAN ENGINE MODULE

(75) Inventors: Kuo-Nien Liu, New Taipei (TW); Kenneth Liou, New Taipei (TW)

(73) Assignee: Marson Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 13/193,202

(22) Filed: Jul. 28, 2011

(65) Prior Publication Data

US 2012/0024957 A1 Feb. 2, 2012

(30) Foreign Application Priority Data

Jul. 30, 2010 (TW) ................................ 99214665 U

(51) Int. Cl.
*G06K 7/14* (2006.01)

(52) U.S. Cl. .................................. 235/454; 235/462.43

(58) Field of Classification Search .................. 235/454, 235/462.43
See application file for complete search history.

(56) References Cited

U.S. PATENT DOCUMENTS 6,385,352 B1 * 5/2002 Roustaei ....................... 382/324

* cited by examiner

*Primary Examiner* — Kristy A Haupt
(74) *Attorney, Agent, or Firm* — Muncy, Geissler, Olds & Lowe, PLLC

(57) ABSTRACT

A micro scan engine module is provided, which is used to scan and read barcode data. The micro scan engine module includes an outer case and a circuit board, in which the outer case is formed as an integral body. After the outer case and the circuit board are assembled, a complete scan engine module is formed. Through the integral design of the outer case, the errors during assembly the components are reduced, the working efficiency of the scan engine module is effectively improved, and the manufacturing cost is reduced.

6 Claims, 7 Drawing Sheets

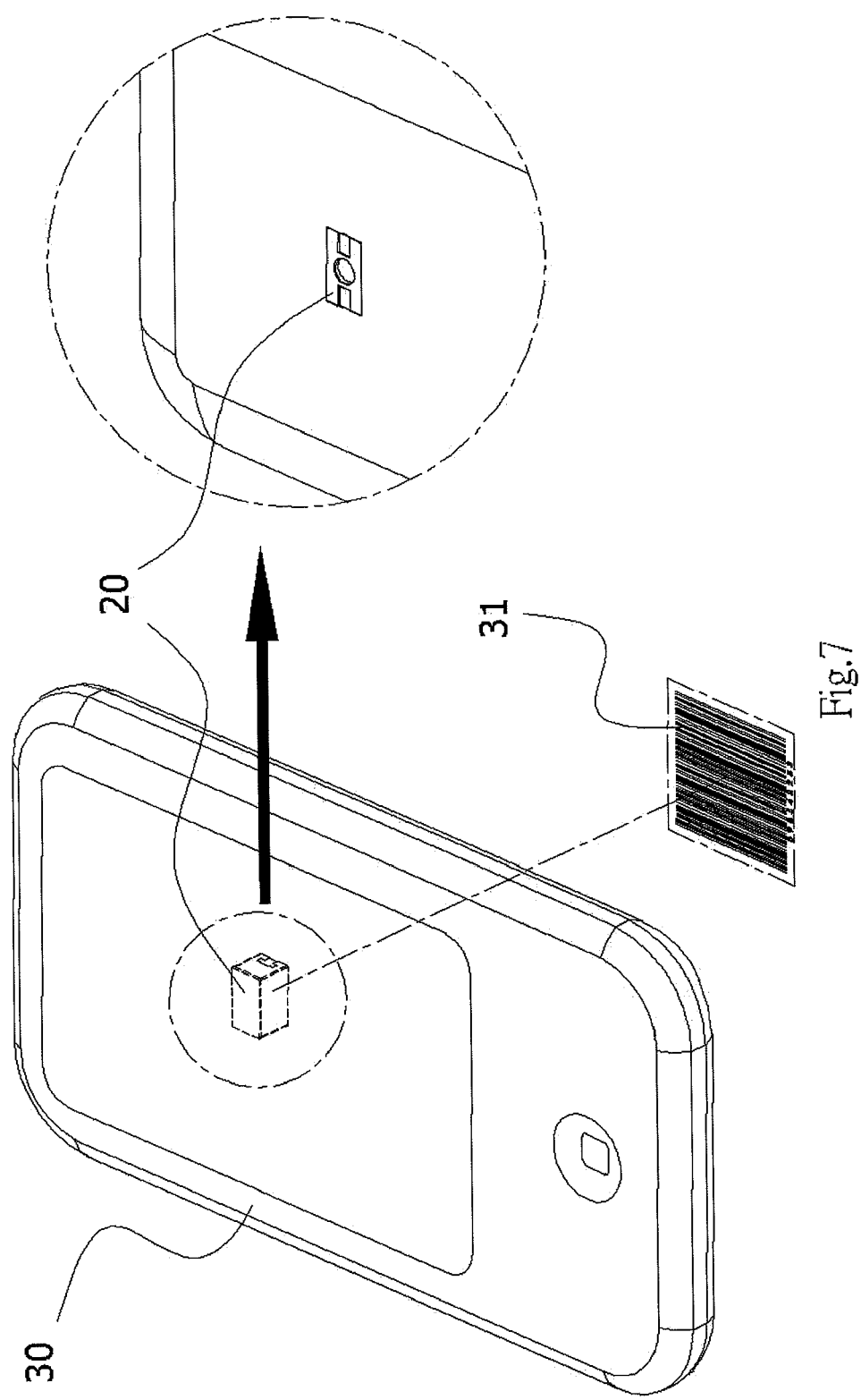

MICRO SCAN ENGINE MODULE

BACKGROUND OF THE INVENTION

1. Field of Invention

The present invention relates to a micro scan engine module, which is used to scan and read barcode information, and more particularly to a micro scan engine module having a case body formed integrally.

2. Related Art

FIG. 1 is a schematic structural view of a conventional scan engine module. Referring to FIG. 1, the scan engine module 10 is disposed in a device such as a scanner or a barcode reader, so as to scan or read barcode information. The scan engine module 10 includes a cover 101, a base 102 and a circuit board 103. More than one first light reflectors 1011 and a second light reflector 1012 are assembled inside the cover 101. The base 102 may be provided to assemble the cover 101, and a light channel 1021 is formed at the bottom inside the base 102. A light source channel 1022 is respectively formed at two ends of the light channel 1021. A lens 1023 is assembled at one end of the light channel 1021, and a collecting lens 1024 is assembled at one end of the light source channel 1022. Moreover, the bottoms of the other ends of the light source channel 1022 and the light channel 1021 are formed hollow. Two light emitting diodes (LEDs) 1031 and a light source sensor 1025 are electrically connected to a plane of the circuit board 103, and the circuit board 103 is assembled at the bottom of the base 102.

FIG. 2 is a schematic view of implementation of the conventional scan engine module. Referring to FIG. 2, after the components are assembled, the first light reflector 1011 is located above the LEDs 1031, and the second light reflector 1012 is located above the light source sensor 1025. When the LEDs 1031 are actuated, a light source A generated by the LEDs 1031 is reflected by the first reflector 1011 and is emitted out through the light source channel 1022. After the light source A is irradiated on an object, a reflected light B is formed, and is refracted by the second light reflector 1012 after being collected by the lens 1023 and is irradiated on the light source sensor 1025, so that the light source sensor 1025 can read related information. It can be known that, the outer case part of the conventional scan engine module 10 includes the cover 101 and the base 102, and the number of the components inside is complicated. In fact, the size of the module is quiet large, therefore, if the module applies in smaller devices, it would be unable to attain the need of microminiaturization, yet also the application of the module would be limited considerably. Moreover, errors easily occur during assembling of the first light reflectors 1011 and the second light reflectors 1012 on the cover 101, which causes deviation of focal length and light, thereby influencing the overall function. Furthermore, the manufacturing cost is increased due to the multiple components being included.

SUMMARY OF THE INVENTION

In view of the above problems, the present invention is directed to a micro scan engine module that can effectively reduce the errors in assembly and improve the efficiency of the scan engine.

In order to achieve the objectives, the micro scan engine module of the present invention mainly includes an outer case and a circuit board. The outer case is formed integrally, and the circuit board and the outer case are assembled into a whole. Due to the integral design of the outer case, the assembly errors caused during assembly of the components are effectively reduced, and the manufacturing cost is effectively decreased.

BRIEF DESCRIPTION OF THE DRAWINGS

The present invention will become more fully understood from the detailed description given herein below for illustration only, and thus are not limitative of the present invention, and wherein:

FIG. 7 shows another embodiment of the present invention.

DETAILED DESCRIPTION OF THE INVENTION

Figure 1:
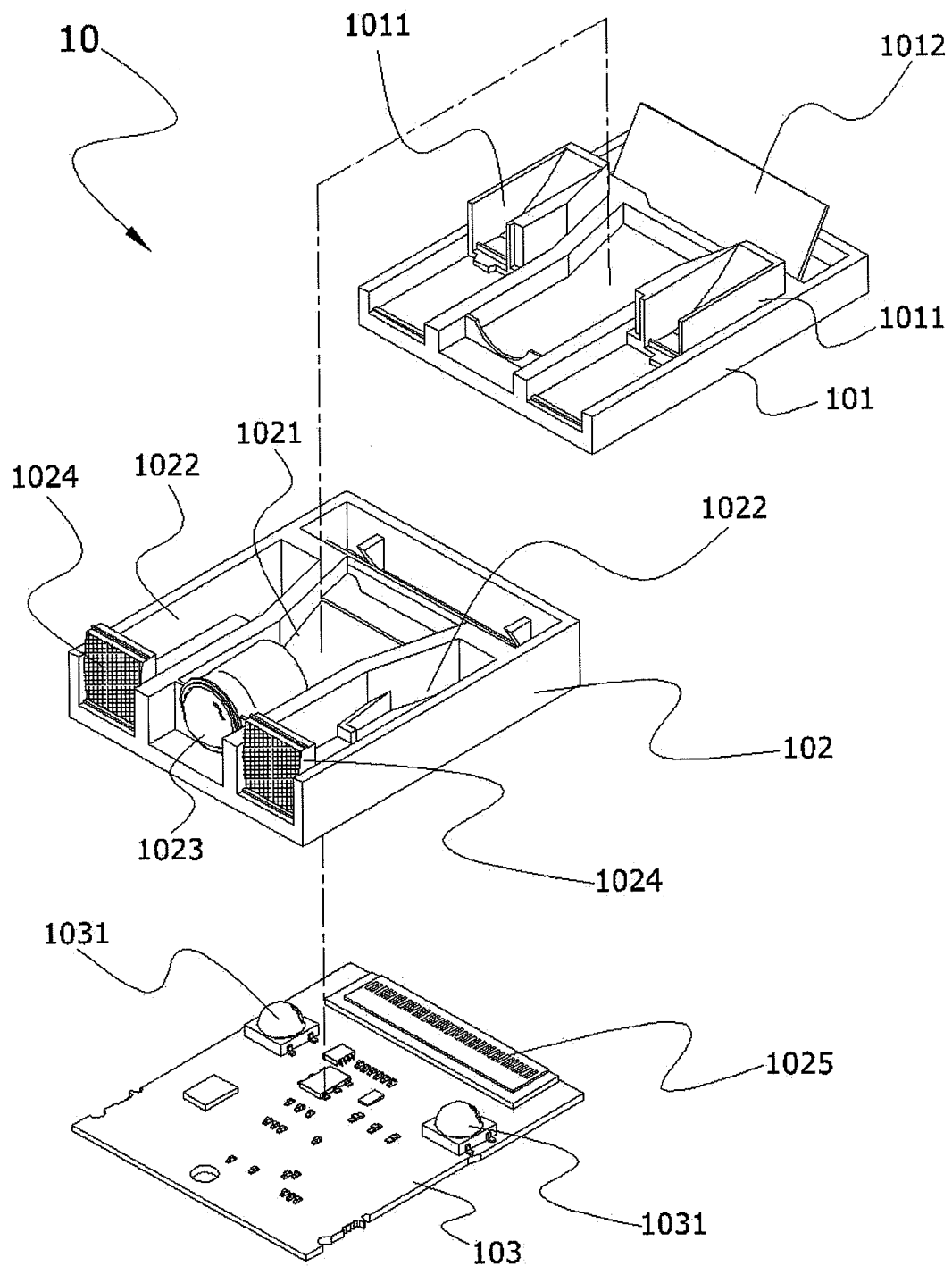
FIG. 1 is a schematic structural view of a conventional scan engine module.
Figure 2:
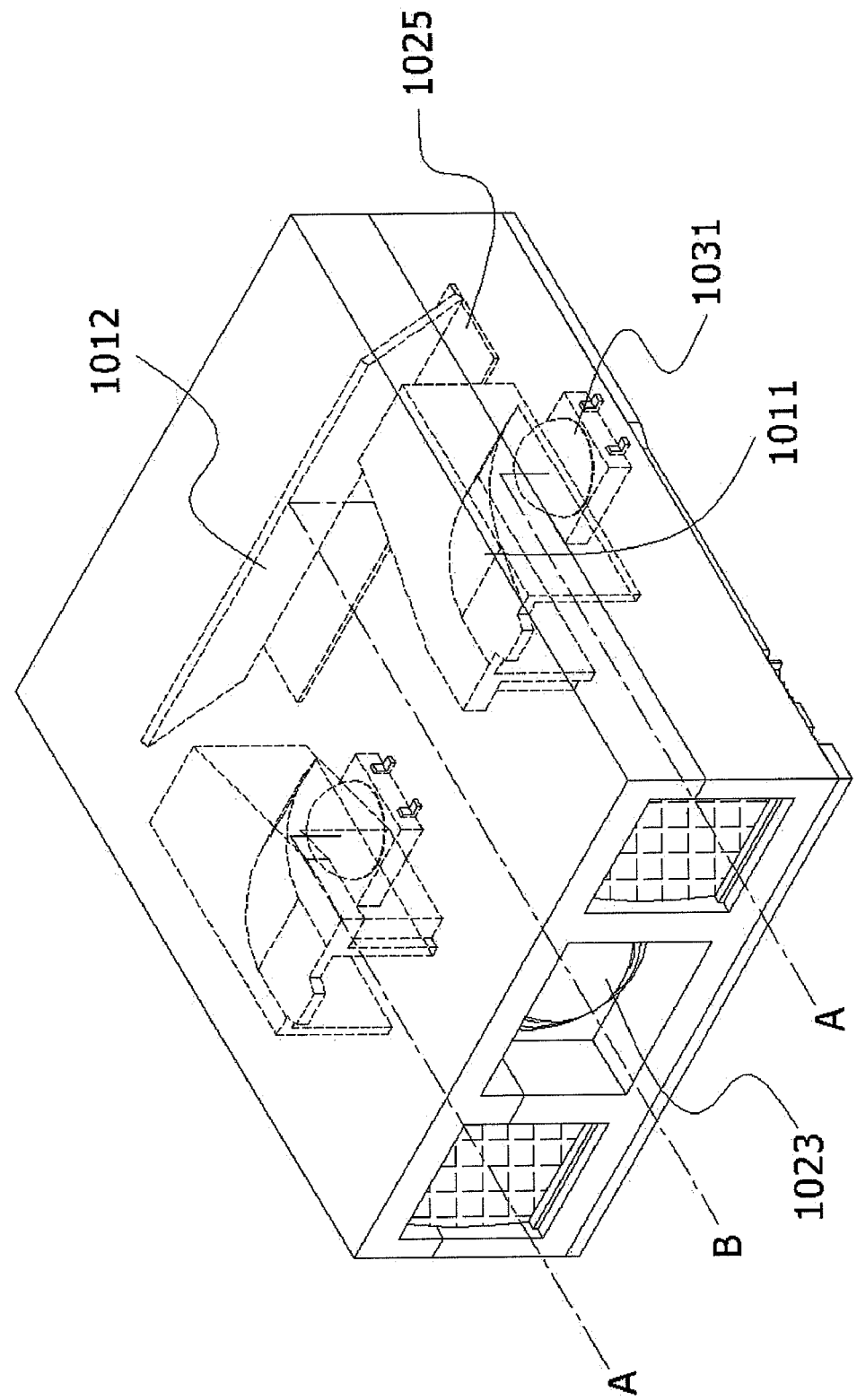
FIG. 2 is a schematic view of implementation of the conventional scan engine module.
Figure 3:
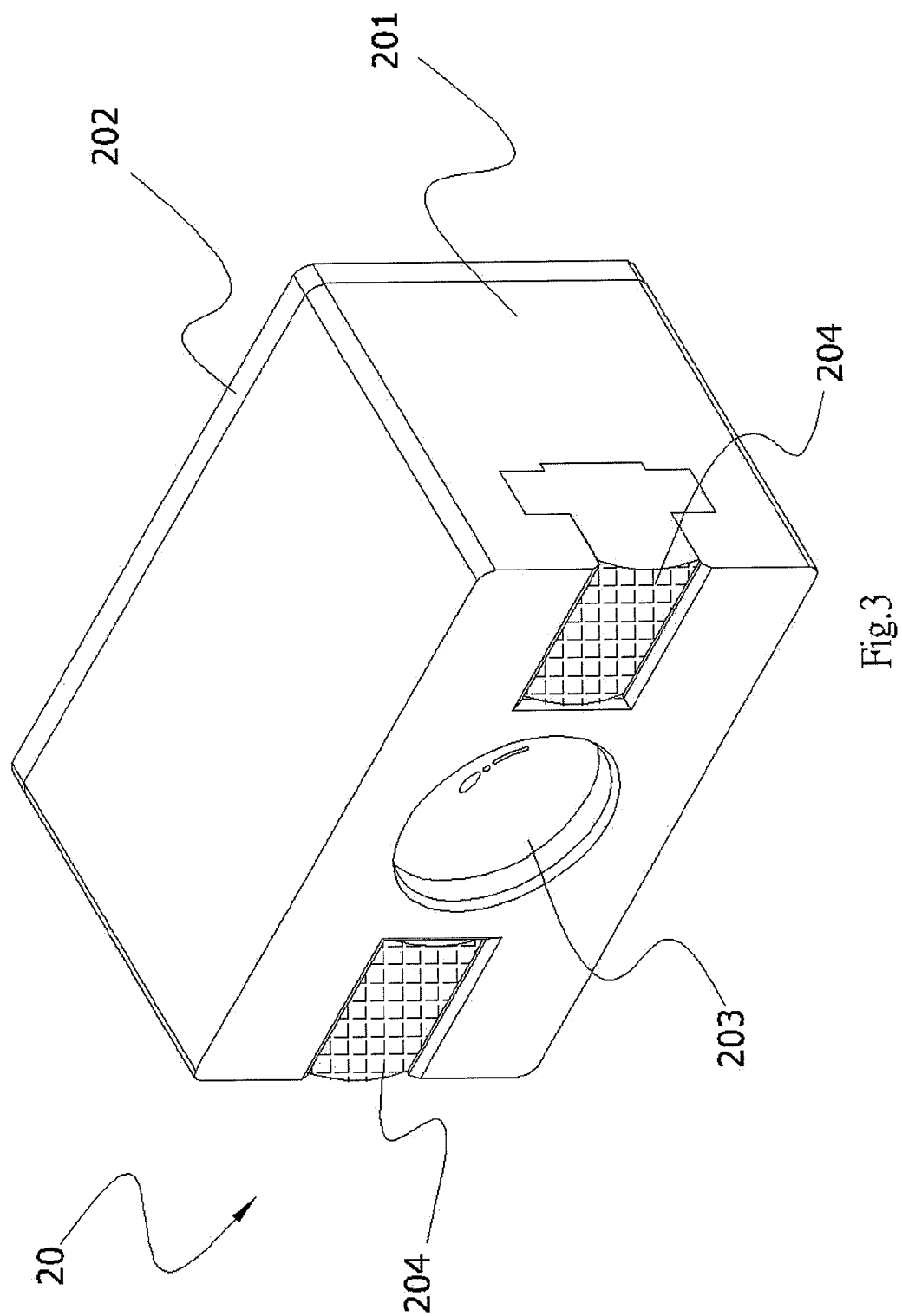
FIG. 3 is a three-dimensional external view of the present invention.

FIG. 3 is a three-dimensional external view of the present invention. As shown in FIG. 3, the micro scan engine module 20 mainly includes an outer case 201 and a circuit board 202. The outer case 201 is a component formed integrally, a lens 203 is assembled in the front of the outer case 201, and a collecting lens 204 is respectively assembled at two sides of the lens 203. Moreover, the circuit board 202 is assembled at the rear of the outer case 201, so that the outer case 201 and the circuit board 202 are formed into a whole after assembly, thereby meeting the requirement of reducing the components for assembly.

Figure 4:
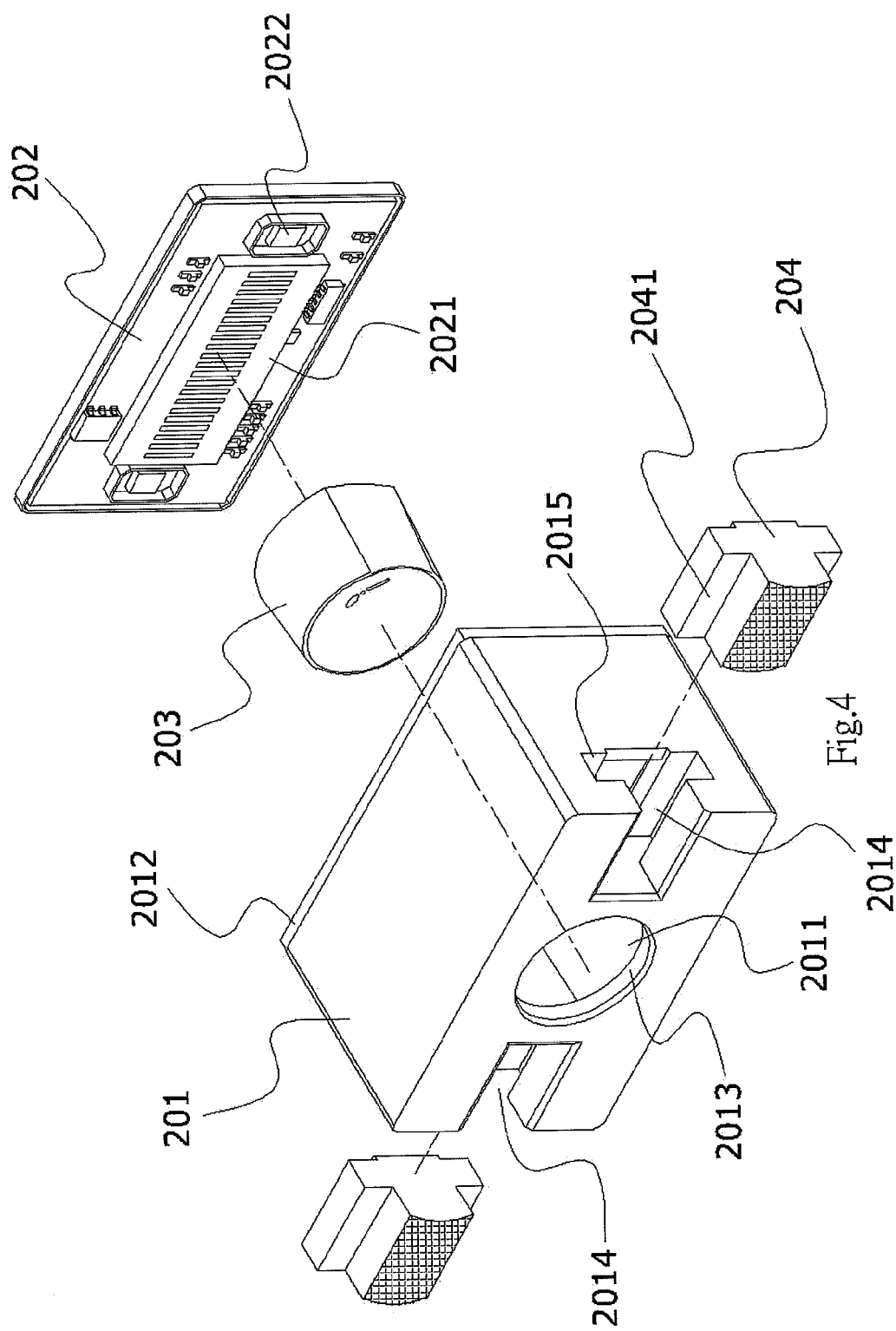
FIG. 4 is a schematic structural exploded view of the present invention.

FIG. 4 is a schematic structural exploded view of the present invention. As shown in FIG. 4, the outer case 201 has an integrally formed aspect, an accommodation space 2011 is provided in the outer case 201, an assembly portion 2012 is formed at the rear of the out case 201, and the assembly portion 2012 and the accommodation space 2011 are in communication. Furthermore, a light incident hole 2013 is formed in the front of the outer case 201, a light emitting hole 2014 is respectively formed at two sides adjacent to the light incident hole 2013, and a fastening portion 2015 is formed in the light emitting hole 2014. A light sensor 2021 for sensing a light is electrically connected to the circuit board 202, and more than one light emitting source (for example, LED or laser diode) 2022 is electrically distributed on a plane adjacent to the light sensor 2021 of the circuit board 202. After the circuit board 202 is driven by a power supply, the light emitting source 2022 emits a light source, and the circuit board 202 may be assembled on the assembly portion 2012 of the outer case 201, so that the circuit board 202 and the outer case 201 are formed into a whole in the normal state after assembly. Accordingly, the lens 203 is assembled in the light incident hole 2013, and the material of the lens 203 may be, for example, transparent resin, glass or plastics, and the surface of the lens 203 may be formed into an arc, so as to achieve the effect of light collection and enlarge the range of light collection. Thus, when being emitted and reflected, the light emitted by the light emitting source 2022 can be collected and irradiated on the light sensor 2021 due to the effect of light collection of the lens 203, thus achieving better efficiency when the light sensor 2021 senses the light. Moreover, the collecting lens 204 has the effect of light collection, and an opposite fastening portion 2041 is formed on the collecting lens 204, so when the collecting lens 204 is assembled in the light emitting hole 2014, the opposite fastening portion 2041 may be further fastened with the fastening portion 2015, so that the collecting lens 204 can be fixed in the light emitting hole 2014 in the normal sate, and the collecting lens 204 after being fixed enables the light emitted by the light emitting source 2022 to have the effect of light collection when passing through the collecting lens 204, thus improving the intensity of the light irradiated on an object by the light emitting source 2022. The aspect of the component after being assembled is shown in FIG. 3.

Figure 5:
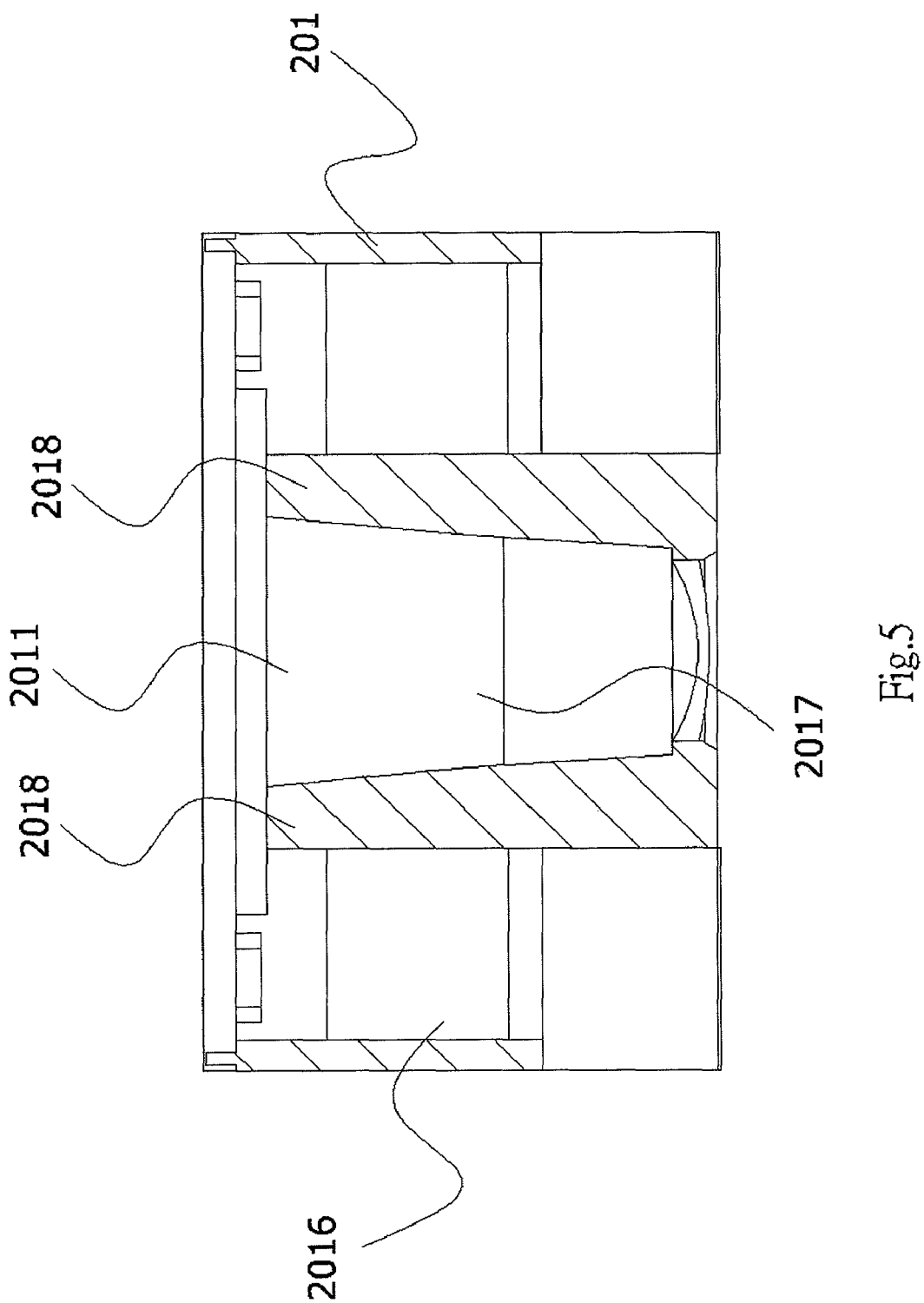
FIG. 5 is a schematic structural view (I) of the present invention.
Figure 6:
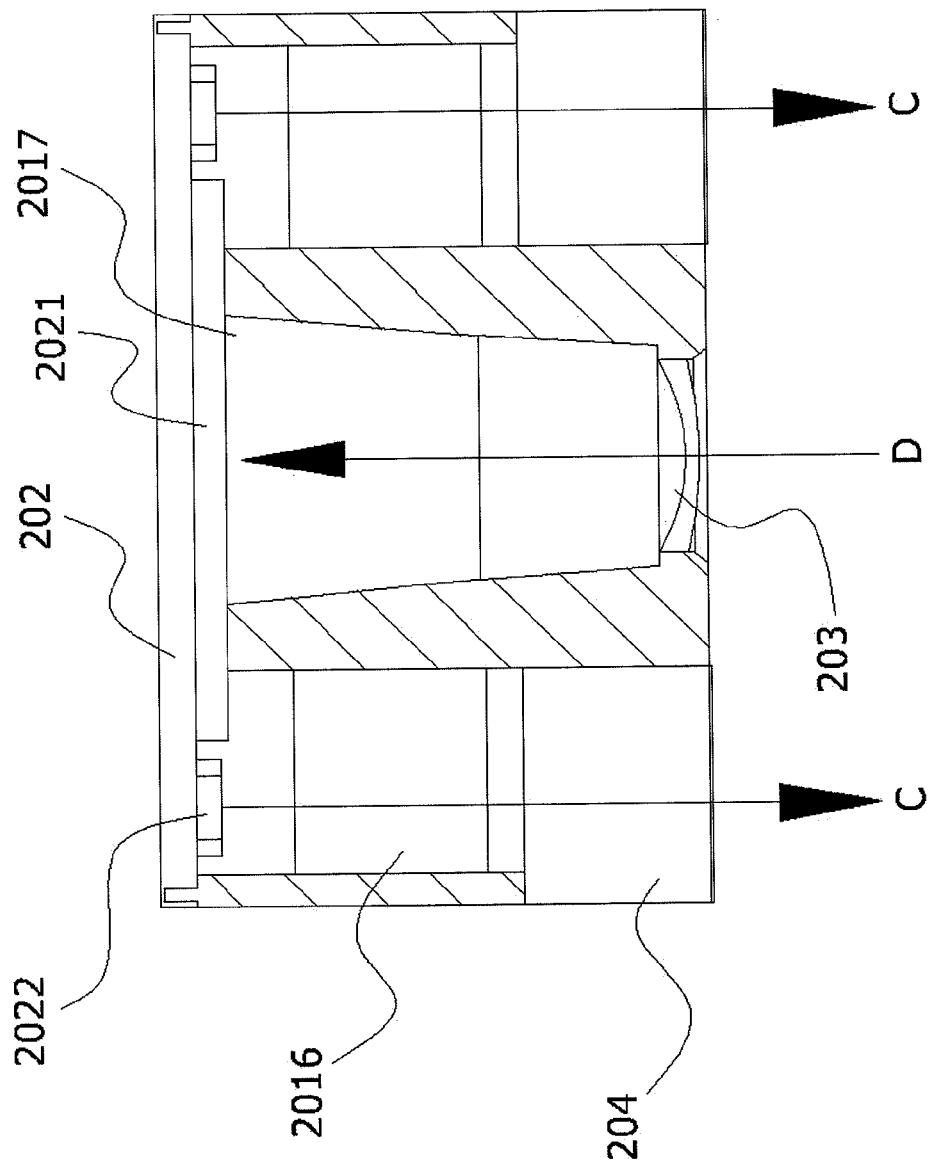
FIG. 6 is a schematic view of implementation of the present invention.

FIG. 5 is a schematic structural view (I) of the present invention. As shown in FIG. 5, a first light source channel 2016 and a second light source channel 2017 are formed in the accommodation space 2011 inside the outer space 201, and a closed block wall 2018 is formed between the light source channels (2016 and 2017), so that the light source channels (2016 and 2017) form independent spaces, thereby avoiding interference of light when the light passes through the light source channels (2016 and 2017). FIG. 6 is a schematic view of implementation of the present invention. Referring to FIG. 6 further, in the implementation of the present invention, when the circuit board 202 is driven by a power supply, the light emitting source 2022 generates a light source C, and the emitted light source C directly passes through the first light source channel 2016 and is irradiated on the collecting lens 204. After passing through the collecting lens 204, the light source C is irradiated on a surface of an object, for example, a barcode pattern. After the surface of the object is irradiated by the light source C, a reflected light D is further generated, and the generated reflected light D is then irradiated on the lens 203 and enters the second light source channel 2017. After being collected by the lens 203, the reflected light D is collected and irradiated on the light sensor 2021, so that the light sensor 2021 can sense the reflected light D, and perform analysis through an electronic unit of the circuit board 202.

FIG. 7 shows another embodiment of the present invention. As shown in FIG. 7, the whole micro scan engine module 20 is a micro module by using the present invention, and can be further assembled on a handheld communication device 30 or other handheld electronic devices. As shown in FIG. 7, a user can use the micro scan engine module 20 assembled on the handheld communication device 30 to scan or read data, for example, scan a barcode 31, so that information on the barcode 31 can be displayed on the handheld communication device 30 after recognition for convenience of data scanning or reading by the user.

In view of the above, in the micro scan engine module of the present invention, the outer case is formed integrally, so as to reduce the number of the components and simplify the assembly of the whole module. After implementation of the present invention, the objective of providing a micro scan engine module that can effectively reduce the errors in assembly and improve the efficiency of the scan engine can be actually achieved.

The above descriptions are merely preferred embodiments of the present invention, but are not intended to limit the protection scope of the present invention. Any modification, equivalent replacement, and improvement made by persons skilled in the art without departing from the spirit and scope of the present invention shall fall within the protection scope of the present invention.

LIST OF REFERENCE NUMERALS

Scan Engine Module
101 Cover
102 Base
1011 First light reflector
1021 Light channel
1012 Second light reflector
1022 Light source channel
103 Circuit board
1023 Lens
1031 LED
1024 Collecting lens
1025 Light source sensor
10 Micro scan engine module
201 Outer case
202 Circuit board
2011 Accommodation space
2021 Light sensor
2012 Assembly portion
2022 Light emitting source
2013 Light incident hole
204 Collecting lens
2014 Light emitting hole
2015 Fastening portion
2016 First light source channel
2017 Second light source channel
2018 Block wall
203 Lens
30 Handheld communication device
31 Barcode
A Light source
B Reflected light
C Light source
D Reflected light

What is claimed is:

1. A micro scan engine module, applicable to data scanning and reading, comprising:

an integrally formed outer case, having an end formed into an assembly portion, wherein an accommodation space is formed in the outer case, a first light source channel and a second light source channel are formed in the accommodation space, a light emitting hole is formed at an end of the first light source channel, and a light incident hole is formed at an end of the second light source channel;

a circuit board, assembled on the assembly portion, wherein a light emitting source and a light sensor circuit board are electrically distributed on a plane of the circuit board; and after the circuit board is assembled at the assembly portion of the outer case, the light emitting source corresponds to the first light source channel, a light sensor on the light sensor circuit board corresponds to the second light source channel, and the circuit board is mounted at another end of the first and second light source channels directly opposite the light incident hole and the light emitting hole.

2. The micro scan engine module according to claim 1, wherein a lens is assembled in the light incident hole.

3. The micro scan engine module according to claim 1, wherein a fastening portion is formed in the light emitting hole.

4. The micro scan engine module according to claim 3, further comprising a collecting lens, wherein the collecting lens has an opposite fastening portion, and the collecting lens is assembled on the fastening portion of the light emitting hole through the opposite fastening portion.

5. The micro scan engine module according to claim 4, wherein the fastening portion is a hole that extends through the side of the outer case into the first light source channel.

6. The micro scan engine module according to claim 5, wherein the opposite fastening portion includes at least one tab that extends from the collecting lens, the tab being the size and shape of the fastening portion, thereby allowing the collecting lens to be securely fastened in the hole.

* * * * *